Sept. 1, 1970  J. GACHOT  3,526,386
VALVE OF PLASTIC MATERIAL
Filed June 24, 1968

INVENTOR
JEAN GACHOT
By Young + Thompson
ATTYS.

United States Patent Office 3,526,386
Patented Sept. 1, 1970

3,526,386
VALVE OF PLASTIC MATERIAL
Jean Gachot, 179 Avenue de la Division Leclerc,
Enghien, Val d'Oise, France
Filed June 24, 1968, Ser. No. 739,297
Claims priority, application France, June 30, 1967,
112,613
Int. Cl. F16k 27/00
U.S. Cl. 251—366  7 Claims

ABSTRACT OF THE DISCLOSURE

The valve has tubular branches of plastic material which provide a connection with a piping system. A rigid strengthening core is inserted within the plastic material of each valve branch and is provided at the end remote from the valve body with a threaded ring which is adapted to project from the valve branch and on which the valve-clamping flange is intended to be mounted.

---

This invention relates to a valve of improved design comprising a body and branches which are formed of molded plastic material.

In valves of this type which are already known, the plastic material employed is usually polyvinyl chloride or high-density polyethylene. In some designs, the valve diaphragm is formed of polytetrafluoroethylene (PTFE) and is joined to the operating rod by means of a bellows seal which is fabricated from the same material, with the result that the fluid which is circulated within the interior is only in contact with plastic materials.

After mounting in the pipe or duct, valves of this type are subjected to high tensile or compressive forces which arise from the stresses in the duct, especially when this latter is of large diameter.

In some extreme cases, the plastic material of which the branches are made is liable to be deformed under the action of stress, thereby impairing the operation of the valve.

Coupling of valves of this type to the duct counter-flanges is usually carried out as follows: a valve branch terminates in a projecting annular collet. An annular flange which is larger in diameter than the collet is passed over the valve branch. Two shouldered half-rings are inserted separately around the branch within the annular flange and brought together so that their shouldered portions are applied against the branch collet. Said shouldered portions then serve as an abutment for the flange which can no longer escape from the valve branch.

The mode of assembly which has just been described calls for a fairly large number of components as well as accurate assembly inasmuch as the valve-branch collet is liable to be damaged and to result in leakage if the duct is not placed in strictly coaxial relation with the valve branch.

The air of this invention is to overcome the above-noted disadvantages in a simple manner.

In accordance with the invention, the valve comprising a tubular body fitted with a closure device and tubular branches of plastic material which provide a connection with the piping system is characterized in that each valve branch contains a rigid strengthening core, said core being inserted in the plastic material and provided at the end remote from the valve body with a ring which is adapted to project from said valve branch and on which the valve-clamping flange is intended to be mounted.

In a preferred arrangement of the invention, each strengthening core is provided with anchoring recesses for the purpose of bonding said core to the plastic material of which the valve branch is made.

The strengthening core is advantageously constituted by a sleeve whilst the anchoring recesses consist of perforations formed radially in said sleeve.

Preferably, the ring is adapted to project relative to the sleeve and is pierced by further axial perforations which also serve to anchor said ring in the valve branch.

Further properties of the invention which relate in particular to the anchoring recesses will further become apparent from the description which follows hereinafter.

A preferred embodiment of the invention is shown in the accompanying drawings which are given by way of non-limitative example, and in which.

Figure 1:
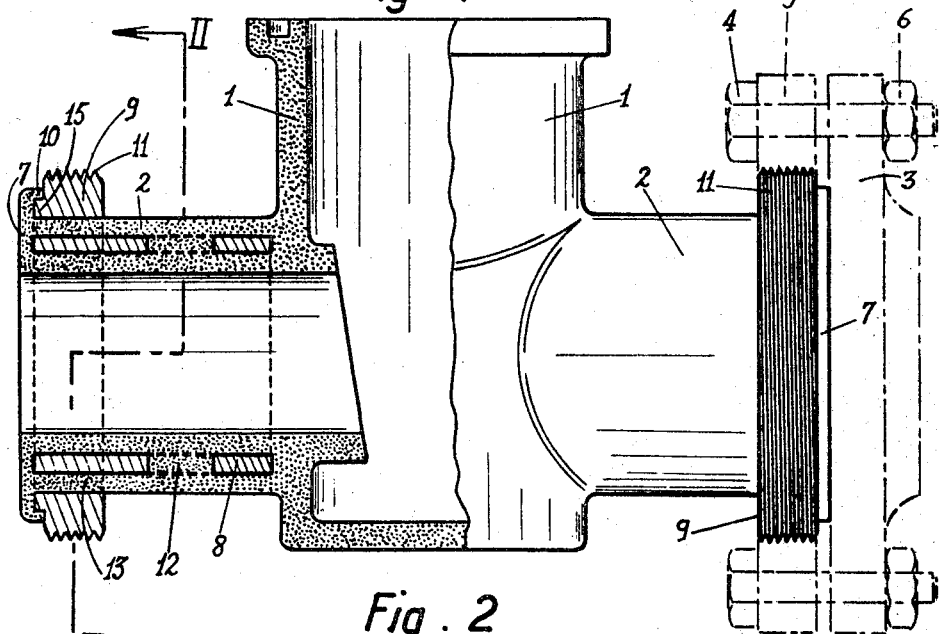
FIG. 1 is a view of the valve body and branches together with their strengthening cores, this view being taken partly in axial cross-section and partly in external longitudinal cross-section.
Figure 2:
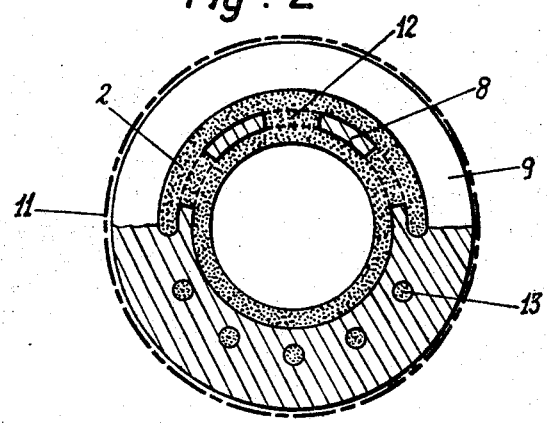
FIG. 2 is a view in transverse cross-section taken along line II—II of FIG. 1.
Figure 3:
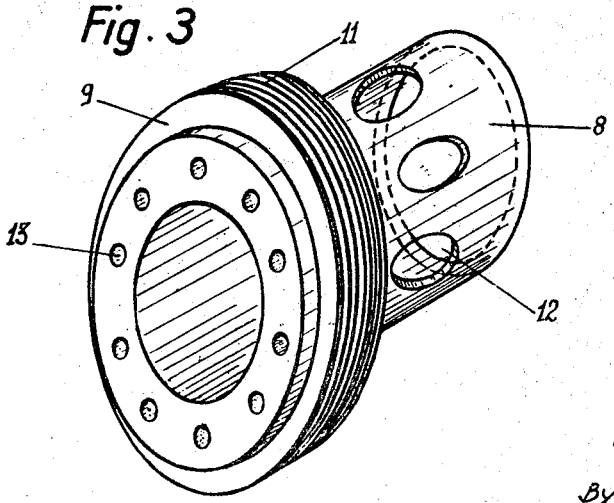
FIG. 3 is a view in perspective of a strengthening core which has been withdrawn from the valve branch.

In the embodiment which is described hereinafter (with reference to FIGS. 1 to 3), the valve body 1 and tubular valve-branches 2 are fabricated from plastic material, and preferably a material which can be molded in the hot state and which affords suitable resistance to deleterious agents. With this object in mind, it would be possible in particular to adopt low-pressure (or high-density) polyethylene having a very high molecular weight (for example higher than $10^6$) or alternatively fluoro-ethylene-propylene of the type which is marketed by Du Pont de Nemours under the trade name FEP-Teflon.

In accordance with the present invention, there is fitted within the thickness of the tubular wall of each valve branch 2 a reinforcement sleeve 8 whose axis coincides with that of the tubular branch and constitutes the rigid strengthening core of said branch.

The reinforcement sleeve 8 which can be formed especially of carbon steel, stainless steel or any other metal is provided at the end remote from the valve body 1 with a ring 9 which forms an annular projection from the valve branch 2 and is provided with an external screwthread 11 so that an annular coupling flange 5 can be screwed thereon.

The sleeve 8 is provided with a set of radial perforations 12 constituting anchoring recesses for the plastic material which is intended to fill said perforations 12 at the time of molding.

With the same object in view, perforations 13 are formed in a circle and extend through the ring 9 parallel to the axis of the tubular valve branch 2. The perforations 13 are also filled with plastic material.

The valve branch 2 terminates in an annular flange 7 of plastic material which projects beyond the ring 9 and has an edge 10 which is placed externally around the shouldered portion 15 of the ring 9.

In order to fit the valve in position, a coupling flange 5 is screwed onto the threaded ring 11 and is attached to the counter-flange 3 which terminates each pipe section by means of bolts 4 on which are screwed clamping nuts 6. The coupling flange 5 and counter-flange 3 are thus clamped against each other whilst the annular flange 7 of the valve branch 2 is compressed therebetween and thus performs the function of a seal.

The technical effects and advantages of the invention are as follows:

Each valve branch 2 is endowed with rigidity as a result of incorporation of the sleeves 8 within the thickness of its tubular wall and is no longer deformed under the action of stresses caused by the duct.

The plastic material which is placed within the perforations 12 forms a bond between the layers of the branch 2 which are separated by the sleeve 8 and prevent this latter from sliding or from becoming detached. The material which is placed within the perforations 13 serves to bond the annular flange 7 to the layer which is placed outside the reinforcement sleeve 8, thereby preventing any deformations of said annular flange 7.

The curved edge 10 increases the resistance of the annular flange to deformations.

The coupling flange 5 can readily be screwed onto the ring 9 and the valve can be mounted in the duct with the requisite degree of precision in order to ensure good leak-tightness. In particular, the bolts 4 can readily be inserted in the bores of the counter-flange 3 and of the flange 5 inasmuch as said bores can be brought into oppositely-facing relation by rotation of the flange 5 on the screw-thread 11.

In addition, by virtue of these arrangements, the service pressure of the valve and the temperature of the fluid which is circulated therein can be increased.

As will be readily understood, the invention is not limited to the example herein described and alternative forms of construction can be contemplated.

Accordingly, the anchoring recesses of the reinforcement sleeve can consist of annular saw-teeth and may or may not be provided with perforations.

The reinforcement sleeve can also be constituted by an assembly of studs which are inserted in the thickness of the valve branch.

Finally, the ring can be provided with an annular abutment so as to limit the extent of screwing of the coupling flange. A strengthening core which is similar in design to the core which has been described above could also be embedded in the casing or shell of the valve body 1.

What is claimed is:

1. A valve structure comprising a hollow valve body of plastic material for housing valving means, and tubular branches integral with said valve body for providing connection with a piping system, each of said tubular branches having embedded therein reinforcement means etxending lengthwise of said tubular branch and defining at the free end thereof a radially projecting ring portion adapted for receiving a valve-clamping flange.

2. A valve structure as claimed in claim 1, wherein each of said tubular branches projects beyond the outer end of said ring portion and provides a seal when said clamping flange is coupled to a counter-flange of the piping system.

3. A valve structure as claimed in claim 1, said radially projecting ring portion having external screw threads thereon for receiving a valve-clamping flange.

4. A valve structure as claimed in claim 1, said radially projecting ring portion extending radially outwardly beyond the plastic material of said tubular branches.

5. A valve structure as claimed in claim 1, wherein said reinforcement means has anchoring means for bonding the reinforcement means to the plastic material in the tubular branch.

6. A valve structure as claimed in claim 5, wherein said reinforcement means is a rigid sleeve having radial perforations that form said anchoring means.

7. A valve structure as claimed in claim 6, wherein said ring portion has perforations arranged in a circle and extending parallel to the axis of the tubular branch.

References Cited

UNITED STATES PATENTS

| | | | |
|---|---|---|---|
| 2,699,801 | 1/1955 | Schleyer | 251—367 XR |
| 2,903,236 | 9/1959 | Holycross et al. | 251—366 |
| 3,001,900 | 9/1961 | Frieder et al. | 264—273 XR |
| 3,185,437 | 5/1965 | Rice | 251—368 XR |
| 3,217,739 | 11/1965 | Valley et al. | 137—375 |
| 3,227,174 | 1/1966 | Yost | 251—368 XR |
| 3,271,845 | 9/1966 | Breher | 264—242 XR |
| 3,421,972 | 1/1969 | Cromwell et al. | 161—218 XR |

SAMUEL SCOTT, Primary Examiner

U.S. Cl. X.R.

251—358, 368